(12) United States Patent
Koga et al.

(10) Patent No.: US 9,874,280 B2
(45) Date of Patent: Jan. 23, 2018

(54) MANUAL TRANSMISSION

(71) Applicant: TOYOTA JIDOSHA KABUSHIKI KAISHA, Toyota-shi, Aichi-ken (JP)

(72) Inventors: Hideaki Koga, Toyota (JP); Akihisa Ohmizu, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/032,500

(22) PCT Filed: Nov. 12, 2014

(86) PCT No.: PCT/IB2014/002545
§ 371 (c)(1),
(2) Date: Apr. 27, 2016

(87) PCT Pub. No.: WO2015/071754
PCT Pub. Date: May 21, 2015

(65) Prior Publication Data
US 2016/0273652 A1    Sep. 22, 2016

(30) Foreign Application Priority Data
Nov. 15, 2013   (JP) ................................ 2013-237230

(51) Int. Cl.
*F16H 63/20*   (2006.01)
*F16H 63/34*   (2006.01)
(Continued)

(52) U.S. Cl.
CPC ......... *F16H 63/3408* (2013.01); *F16H 57/02* (2013.01); *F16H 63/20* (2013.01); *F16H 63/302* (2013.01); *F16H 2063/208* (2013.01)

(58) Field of Classification Search
CPC .... F16H 63/302; F16H 63/3408; F16H 63/20; F16H 2063/208; F16H 57/02
See application file for complete search history.

(56) References Cited

U.S. PATENT DOCUMENTS 4,466,305 A * 8/1984 Hiraiwa .................... F16H 3/34
74/384
4,605,109 A * 8/1986 Fukuchi .................... F16H 3/38
192/219
(Continued)

FOREIGN PATENT DOCUMENTS

EP   1 517 070 A2   3/2005
EP   2 133 602 A2   12/2009
(Continued)

*Primary Examiner* — Victor L MacArthur
*Assistant Examiner* — Bobby Rushing, Jr.
(74) *Attorney, Agent, or Firm* — Oliff PLC

(57) ABSTRACT

A manual transmission includes: a shift selection shaft (20); a shift inner lever (32) including an arm portion (32*b*) provided on an outer side of a tubular portion (32*a*) so as to project outwardly in a radial direction; an interlock plate (34) including a projection (34*b*) provided on an outer side of a boss portion (34*a*) so as to project outwardly in the radial direction; and a reverse shift arm (41) supported by a transmission case (C) via a bracket (42) in a pivoting manner. The bracket is provided with a regulation portion (46) for regulating inclination of the interlock plate at the time of a shift operation.

2 Claims, 14 Drawing Sheets

(51) Int. Cl.
*F16H 63/30* (2006.01)
*F16H 57/02* (2012.01)

(56) References Cited

U.S. PATENT DOCUMENTS

| | | | | |
|---|---|---|---|---|
| 4,827,792 | A | * | 5/1989 | Uetake ................. F16H 63/302 74/106 |
| 5,515,742 | A | * | 5/1996 | Ibushuki ................. F16D 23/12 192/218 |
| 5,560,254 | A | * | 10/1996 | Certeza ................. F16H 63/302 267/150 |
| 5,582,071 | A | * | 12/1996 | Fujii ....................... F16H 63/20 192/218 |
| 8,381,606 | B2 | * | 2/2013 | Furquim ............... F16H 63/302 74/331 |

FOREIGN PATENT DOCUMENTS

| | | | |
|---|---|---|---|
| FR | 2838176 A1 * | 10/2003 | ............. F16H 63/20 |
| JP | 2005-090710 A | 4/2005 | |
| JP | 2009-299707 A | 12/2009 | |
| JP | 2010-053895 A | 3/2010 | |

\* cited by examiner

MANUAL TRANSMISSION

BACKGROUND OF THE INVENTION

1. Field of the Invention

The present invention relates to a manual transmission, and particularly, relates to a manual transmission for establishing one of multiple forward gear positions and a reverse gear position by combining a selection operation and a shift operation in response to a gear change request.

2. Description of Related Art

As illustrated in Japanese Patent Application Publication No. 2010-53895 (JP 2010-53895 A), a manual transmission is provided with a select shift mechanism. The select shift mechanism performs a selection operation to rotate a shift selection shaft around its axis, and a shift operation to displace the shift selection shaft in its axis direction in a reciprocating manner, and is provided with an interlock plate for preventing meshing of two or more shift gears at the same time.

The interlock plate is provided so as to be rotatable integrally with a shift inner lever outwardly engaged with the shift selection shaft in an integrated manner and to allow the shift inner lever to move in its axis direction.

SUMMARY OF THE INVENTION

In JP 2010-53895 A, when the shift selection shaft and the shift inner lever are displaced integrally in the axis direction, a selected head portion may press the interlock plate, and the interlock plate may be inclined accordingly.

If the interlock plate is inclined, "stick-slip" occurs between the interlock plate and the shift inner lever at the time when the shift inner lever is displaced in the axis direction relative to the interlock plate. As a result, sliding friction increases, which prevents a smooth change gear operation.

In contrast, in JP 2010-53895 A, the inclination of the interlock plate is restrained by a restoring force to move an unselected head portion back to a neutral position. However, if a shift operation force transmitted to the shift inner lever and a fork shaft along with the shift operation exceeds a spring force of a coil spring of a detent mechanism provided in the fork shaft, the interlock plate may be inclined.

The present invention provides a manual transmission which establishes one of multiple forward gear positions and a reverse gear position by combining a selection operation and a shift operation in response to a gear change request, and which effectively prevents inclination of an interlock plate at the time of the shift operation.

An aspect of the present invention relates to a manual transmission for establishing one of multiple forward gear positions and a reverse gear position by combining a selection operation and a shift operation in response to a gear change request. The manual transmission includes a transmission case, a shift selection shaft, a shift inner lever, an interlock plate, a reverse lever, and a reverse shift arm. The shift selection shaft is supported by the transmission case. The shift selection shaft is configured such that the selection operation to rotate the shift selection shaft around its axis and the shift operation to displace the shift selection shaft in an axis direction where the axis extends are performed thereon. The shift inner lever includes a tubular portion and an arm portion. The tubular portion is integrally fitted to a radial outside of the shift selection shaft. The arm portion is provided on a radial outside of the tubular portion. The arm portion is extended outwardly in a radial direction of the tubular portion. The interlock plate includes a boss portion and a projection. The boss portion is fitted to the radial outside of the tubular portion so as to be displaced in the axis direction relative to the tubular portion of the shift inner lever and to rotate integrally with the tubular portion around the axis. The projection is provided on a radial outside of the boss portion so as to extend outwardly in the radial direction. The projection has a slit so that the arm portion is inserted into the slit so as to be displaced in the axis direction relative to the projection. The reverse lever is provided integrally with the shift selection shaft. The reverse shift arm is supported by the transmission case via a bracket so as to pivot relative to the transmission case. The reverse shift arm is pivoted by rotations of the reverse lever and the shift selection shaft along with the shift operation to the reverse gear position. The bracket is provided with a regulation portion for regulating inclination of the interlock plate at the time when the shift operation is performed.

In this configuration, when an inclination force is applied to the interlock plate in the course where the shift inner lever is displaced relative to the interlock plate along with the shift operation, the regulation portion provided in the bracket restrains inclination of the interlock plate.

Here, in the present invention, the bracket is fixed to the transmission case. This allows the regulation portion provided in the bracket to firmly receive the interlock plate without backlash.

Hereby, at the time of the shift operation, it is possible to restrain "stick-slip" from occurring between the boss portion of the interlock plate and that tubular portion of the shift inner lever which is inwardly engaged with the boss portion. Accordingly, when the shift inner lever and the shift selection shaft are displaced integrally in the axis direction, it is possible to restrain an increase of sliding friction between the interlock plate and the shift inner lever, thereby attaining a smooth change gear operation.

In the manual transmission, the transmission case may include a recessed portion. A part of the interlock plate may be fitted to the recessed portion via a clearance that allows a relative displacement between the interlock plate and the transmission case. The recessed portion may be configured to regulate the displacement of the interlock plate in the axis direction. At the time when the shift operation to the forward gear positions is performed, an inner wall of the recessed portion and the regulation portion may be configured to receive a wall surface of the projection of the interlock plate so as to regulate the inclination of the interlock plate In this configuration, since there is a clearance between the interlock plate and the recessed portion, the interlock plate could be inclined by just that much at the time of the shift operation to either an even gear position or an odd gear position. However, those two parts of the projection of the interlock plates which are separated from each other on the circumference are received by one inner wall of the recessed portion and the regulation portion, respectively, thereby making it possible to reduce, as much as possible, the inclination of the interlock plate caused due to the clearance.

In the manual transmission, the reverse shift arm may include a reverse head and a reverse shift fork. The reverse lever may be configured to be engaged with the reverse head along with the selection operation to the reverse gear position. The reverse shift fork may be configured to cause an idler reverse gear to mesh with a reverse drive gear and a reverse driven gear along with the pivoting of the reverse shift arm. The regulation portion may be a projection member provided in the bracket so as to project from the vicinity of the reverse head toward the interlock plate.

In this configuration, when an inclination force is applied to the interlock plate along with the shift operation to either an even gear position or an odd gear position, a projection member as the regulation portion receives the interlock plate firmly.

According to the present invention, in a manual transmission for establishing one of multiple forward gear positions and a reverse gear position by combining a selection operation and a shift operation in response to a gear change request, it is possible to effectively restrain the inclination of the interlock plate at the time of the shift operation. Accordingly, the manual transmission according to the present invention can realize a smooth change gear operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
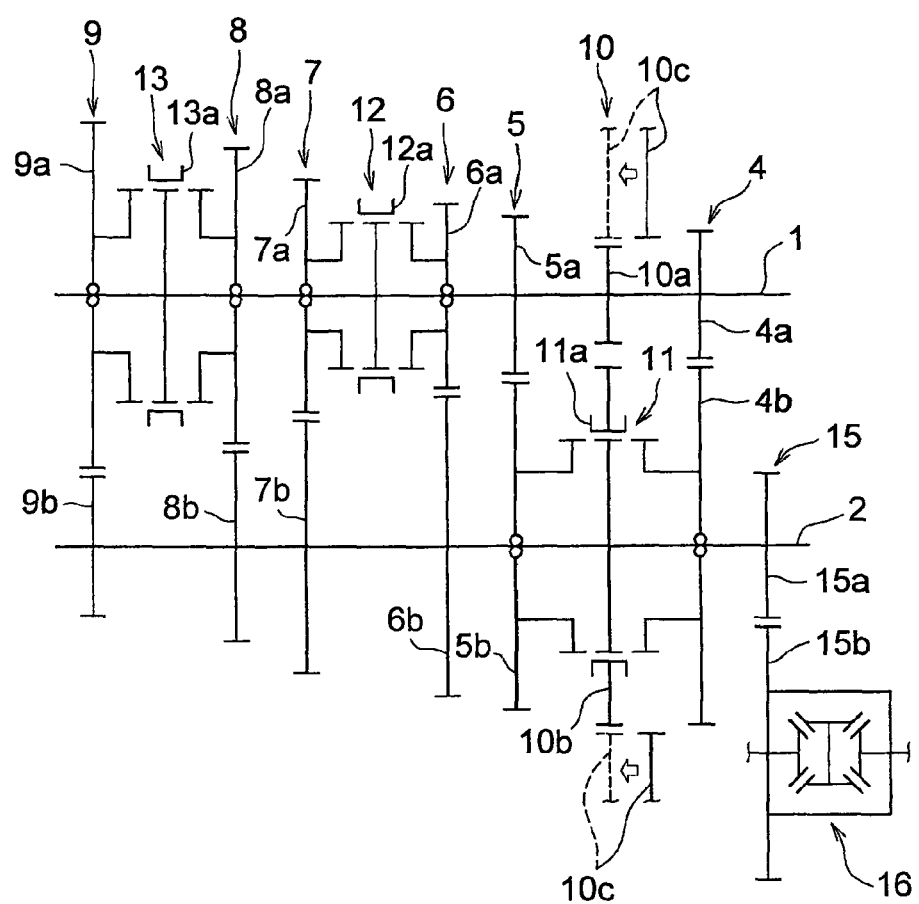
FIG. 1 is a skeleton diagram illustrating one embodiment of a manual transmission according to the present invention.

The following describes a best mode for carrying out the present invention with reference to the drawings.

One embodiment of the present invention is illustrated in FIGS. 1 to 14. Ahead of description of a characteristic configuration of the present invention, the following describes a schematic configuration of a manual transmission with reference to FIGS. 1 to 4.

An input shaft 1, an output shaft 2, and a reverse shaft 3 (shown only in FIGS. 5 and 6) are rotatably supported by a transmission case C in a state where they are placed parallel to each other.

Although not illustrated in the figure, the input shaft 1 is connected to a crankshaft of an engine via a clutch mechanism. The clutch mechanism switches between an engaging state where the crankshaft is connected to the input shaft 1 so as to input a rotational driving force of the engine into the input shaft 1, and a block state where the crankshaft is separated from the input shaft 1 so as not to input the rotational driving force of the engine into the input shaft 1.

A first gear train 4 to a sixth gear train 9 and a reverse gear train 10 for establishing a gear position from among a first forward gear position to a sixth forward gear position and a reverse gear position are provided between the input shaft 1 and the output shaft 2.

More specifically, as gear trains for forward gear positions, the first gear train 4, a second gear train 5, a third gear train 6, a fourth gear train 7, a fifth gear train 8, and the sixth gear train 9 are placed sequentially from the right side toward the left side in the axis direction in FIG. 1. Further, as a gear train for the reverse gear position, the reverse gear train 10 is placed.

The first gear train 4 and the second gear train 5 are configured such that a first-speed drive gear 4a and a second-speed drive gear 5a attached to the input shaft 1 in an integrally rotatable manner are engaged with a first-speed driven gear 4b and a second-speed driven gear 5b attached to the output shaft 2 in a relatively rotatable manner.

The third gear train 6 is configured such that a third-speed drive gear 6a attached to the input shaft 1 in a relatively rotatable manner is engaged with a third-speed driven gear 6b attached to the output shaft 2 in an integrally rotatable manner.

Similarly to the third gear train 6, the fourth gear train 7, the fifth gear train 8, and the sixth gear train 9 include: a fourth-speed drive gear 7a, a fifth-speed drive gear 8a, and a sixth-speed drive gear 9a; and a fourth-speed driven gear 7b, a fifth-speed driven gear 8b, and a sixth-speed driven gear 9b, respectively. The fourth-speed drive gear 7a, the fifth-speed drive gear 8a, and the sixth-speed drive gear 9a are attached to the input shaft 1 in a relatively rotatable manner. The fourth-speed driven gear 7b, the fifth-speed driven gear 8b, and the sixth-speed driven gear 9b are attached to the output shaft 2 in an integrally rotatable manner. The fourth-speed drive gear 7a, the fifth-speed drive gear 8a, and the sixth-speed drive gear 9a are engaged with the fourth-speed driven gear 7b, the fifth-speed driven gear 8b, and the sixth-speed driven gear 9b, respectively.

A switching operation (a change gear operation) of the gear shifting gear trains is performed by three synchromesh mechanisms (synchronizers) 11, 12, 13.

The first synchromesh mechanism 11 is provided on the output shaft 2, and when a sleeve 11a slides, a power is transmitted from the input shaft 1 to the output shaft 2 via the first gear train 4 or the second gear train 5 (the first gear position or the second gear position is established).

The second synchromesh mechanism 12 is provided on the input shaft 1, and when a sleeve 12a slides, a power is transmitted from the input shaft 1 to the output shaft 2 via the third gear train 6 or the fourth gear train 7 (the third gear position or the fourth gear position is established).

The third synchromesh mechanism 13 is provided on the input shaft 1, and when a sleeve 13a slides, a power is transmitted from the input shaft 1 to the output shaft 2 via the fifth gear train 8 or the sixth gear train 9 (the fifth gear position or the sixth gear position is established).

As such, in the forward movement, except a shift change operation, a rotational driving force of the input shaft 1 is transmitted to the output shaft 2 via any one of the first to sixth gear trains 4 to 9 which is selected by an operation of any one of the first to third synchromesh mechanisms 11 to 13.

Figure 4:
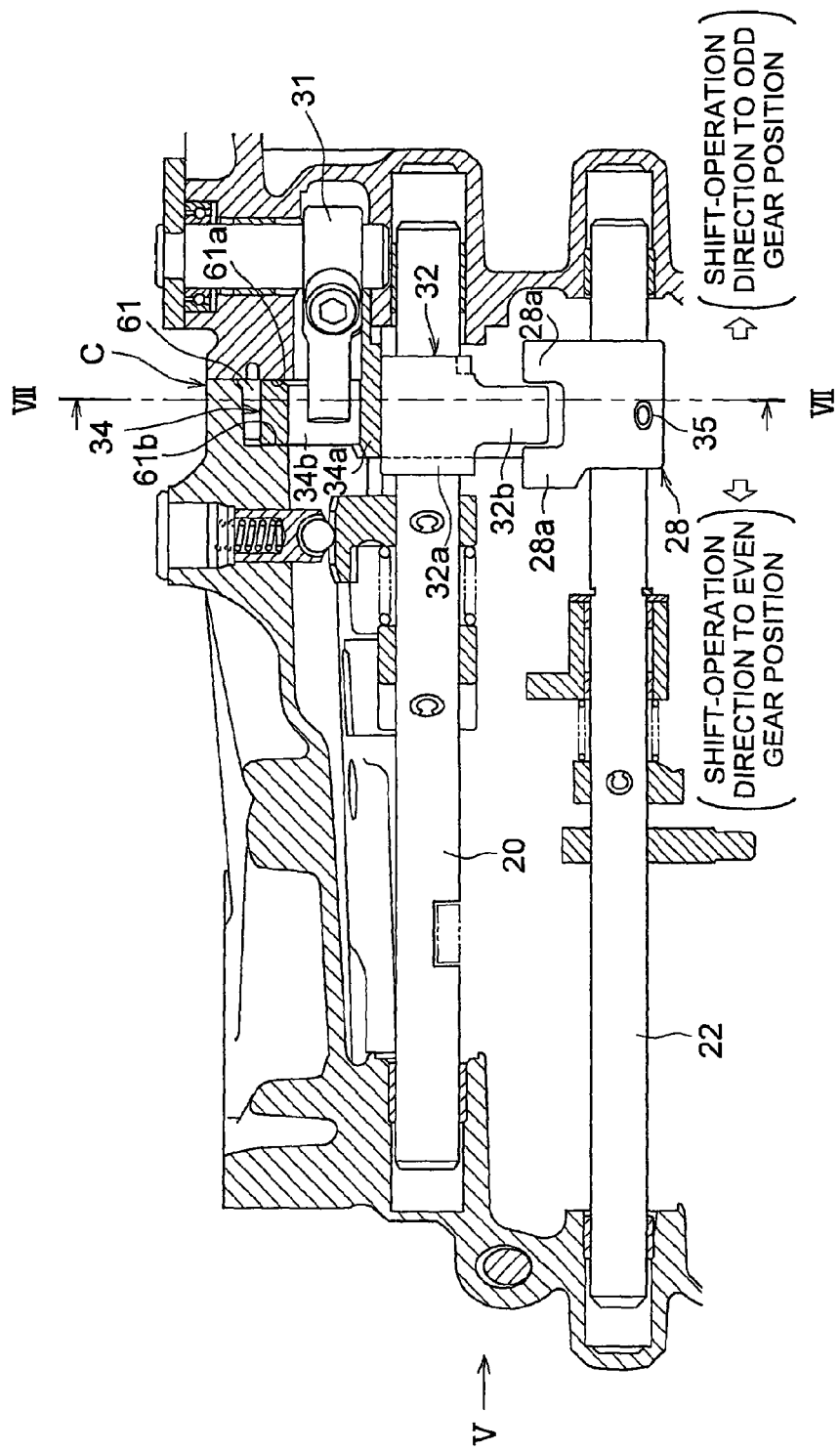
FIG. 4 is a sectional view illustrating a selection shift mechanism provided in the manual transmission of FIG. 1.

Note that the first to third synchromesh mechanisms 11 to 13 have a well-known double-cone configuration, and they have generally the same configuration. In view of this, only the third synchromesh mechanism 13 is illustrated in FIG. 4, and illustrations and descriptions about the first and second synchromesh mechanisms 11, 12 are omitted. The configurations of the first to third synchromesh mechanisms 11 to 13 are not limited to the double-cone type, and may have other configurations.

The reverse gear train 10 includes a reverse drive gear 10a, a reverse driven gear 10b, and an idler reverse gear 10c.

The reverse drive gear 10a is assembled to the input shaft 1 in an integrally rotatable manner. The reverse driven gear 10b is assembled to the output shaft 2 in a relatively rotatable manner. The idler reverse gear 10c is assembled to the reverse shaft 3 in a slidable manner.

The reverse drive gear 10a, the reverse driven gear 10b, and the idler reverse gear 10c do not perform power transmission in the forward movement. In a rearward movement, the first to third synchromesh mechanisms 11 to 13 are all set in a neutral state, and the idler reverse gear 10c is moved along an axis direction of the reverse shaft 3, so as to be engaged with both the reverse drive gear 10a and the reverse driven gear 10b. Hereby, a rotation direction of the reverse drive gear 10a is reversed, so as to transmit a power to the reverse driven gear 10b.

As a result, the output shaft 2 rotates in a reverse direction to a direction at the time of the forward gear position, so that driving wheels rotate in a backward direction. Note that the reverse driven gear 10b is provided on an outer peripheral side of the first synchromesh mechanism 11 in an integrally rotatable manner.

A rotational driving force thus transmitted to the output shaft 2 by gear shifting or reverse rotation at a predetermined transmission gear ratio is slowed down at a final drive ratio of a final reduction gear train 15 (a final drive gear 15a and a final driven gear 15b), and then output to a differential device 16 (not shown). Hereby, the driving wheels (not shown) rotate in the forward direction or the backward direction.

Figure 2:
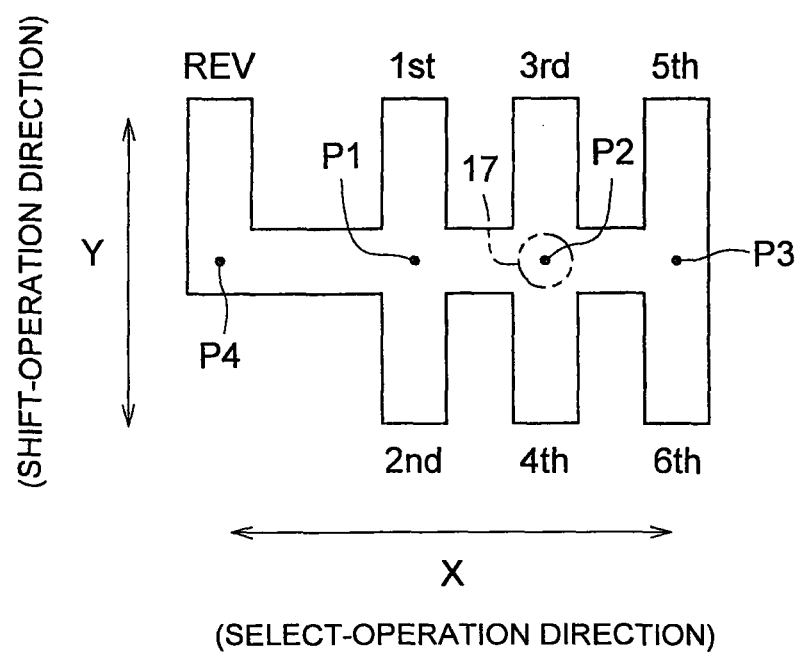
FIG. 2 is a schematic view illustrating a gear change pattern of the manual transmission of FIG. 1.

Referring now to FIG. 2, the following describes a shift pattern (a shift gate shape) of a six-gear manual transmission in this embodiment.

In FIG. 2, a shift lever 17 indicated by an alternate long and two short dashes line performs a selection operation in a direction of an arrow X, and a shift operation in a direction of an arrow Y perpendicular to the selection operation direction.

In the selection operation direction, a first-speed and second-speed selection position P1, a third-speed and fourth-speed selection position P2, a fifth-speed and sixth-speed selection position P3, and a reverse selection position P4 are arranged in line.

At the first-speed and second-speed selection position P1, the shift lever 17 can be shifted to a first speed position 1st or a second speed position 2nd (the shift operation in the direction of the arrow Y). When the shift lever 17 is shift-operated to the first speed position 1st, the sleeve 11a of the first synchromesh mechanism 11 is operated toward the first-speed driven gear 4b, so that the first-speed driven gear 4b is connected to the output shaft 2 in an integrally rotatable manner. Further, when the shift lever 17 is shift-operated to the second speed position 2nd, the sleeve 11a of the first synchromesh mechanism 11 is operated toward the second-speed driven gear 5b, so that the second-speed driven gear 5b is connected to the output shaft 2 in an integrally rotatable manner.

At the third-speed and fourth-speed selection position P2, the shift lever 17 can be shifted to a third speed position 3rd or a fourth speed position 4th. When the shift lever 17 is shift-operated to the third speed position 3rd, the sleeve 12a of the second synchromesh mechanism 12 is operated toward the third-speed drive gear 6a, so that the third-speed drive gear 6a is connected to the input shaft 1 in an integrally rotatable manner. Further, when the shift lever 17 is shift-operated to the fourth speed position 4th, the sleeve 12a of the second synchromesh mechanism 12 is operated toward the fourth-speed drive gear 7a, so that the fourth-speed drive gear 7a is connected to the input shaft 1 in an integrally rotatable manner.

At the fifth-speed and sixth-speed selection position P3, the shift lever 17 can be shifted to a fifth speed position 5th or a sixth speed position 6th. When the shift lever 17 is shift-operated to the fifth speed position 5th, the sleeve 13a of the third synchromesh mechanism 13 is operated toward the fifth-speed drive gear 8a, so that the fifth-speed drive gear 8a is connected to the input shaft 1 in an integrally rotatable manner. Further, when the shift lever 17 is shift-operated to the sixth speed position 6th, the sleeve 13a of the third synchromesh mechanism 13 is operated toward the sixth-speed drive gear 9a, so that the sixth-speed drive gear 9a is connected to the input shaft 1 in an integrally rotatable manner.

Further, at the reverse selection position P4, the shift lever 17 can be shifted to a reverse position REV. When the shift lever 17 is shift-operated to the reverse position REV, the sleeves 11a to 13a of the first to third synchromesh mechanisms 11 to 13 are all turned into a neutral state, and the idler reverse gear 10c is moved along the axis direction of the reverse shaft 3, as to be meshed with the reverse driven gear 10b and the reverse drive gear 10a.

Referring now to FIGS. 3 to 8, a selection shift mechanism is described.

The selection shift mechanism transmits an operation force for the shift lever 17 selectively to the sleeves 11a to 13a of the first to third synchromesh mechanisms 11 to 13 and the idler reverse gear 10c, so as to selectively establish a gear position from among the first forward gear position to the sixth forward gear position and the reverse gear position.

More specifically, the selection shift mechanism includes a shift selection shaft 20, a first fork shaft 21, a second fork shaft 22, a third fork shaft 23, a first shift fork (not shown), a second shift fork (not shown) a third shift fork 26, a first shift head 27, a second shift head 28, a third shift head 29, a selection inner lever 31, a shift inner lever 32, a reverse lever 33, an interlock plate 34, a reverse shift arm 41, and so on.

The shift lever 17 is connected to the shift selection shaft 20 so that the operation force for the shift lever 17 (see FIG. 2) is transmittable via a selection cable and a shift cable (not shown). Hereby, when a selection operation is performed on the shift lever 17 (see the direction of the arrow X in FIG. 2), the shift selection shaft 20 rotates around its axis (directions indicated by arrows M1 and M2 in FIG. 8). When a shift operation is performed on the shift lever 17 (see the direction of the arrow Y in FIG. 2), the shift selection shaft 20 slides toward its axis direction (directions indicated by arrows M3 and M4 in FIG. 8). The shift selection shaft is a shift and selection shaft. In other words the shift selection shaft enables both the shift operation and the selection operation to be performed.

The first fork shaft 21 relates to first-speed and second-speed switching, and the first shift fork (not shown) and the first shift head 27 are integrally attached to a predetermined region of the first fork shaft 21 in its axis direction.

The second fork shaft 22 relates to third-speed and fourth-speed switching, and the second shift fork (not shown) and the second shift head 28 are integrally attached to the second fork shaft 22.

The third fork shaft 23 relates to fifth-speed and sixth-speed switching, and the third shift fork 26 and the third shift head 29 are integrally attached to the third fork shaft 23.

The first shift for (not shown), the second shift fork (not shown) and the third shift fork 26 are engaged with outer peripheral grooves (see only an outer peripheral groove 13b in FIG. 3) of the sleeves 11a to 13a of the first to third synchromesh mechanisms 11 to 13, respectively.

Figure 5:
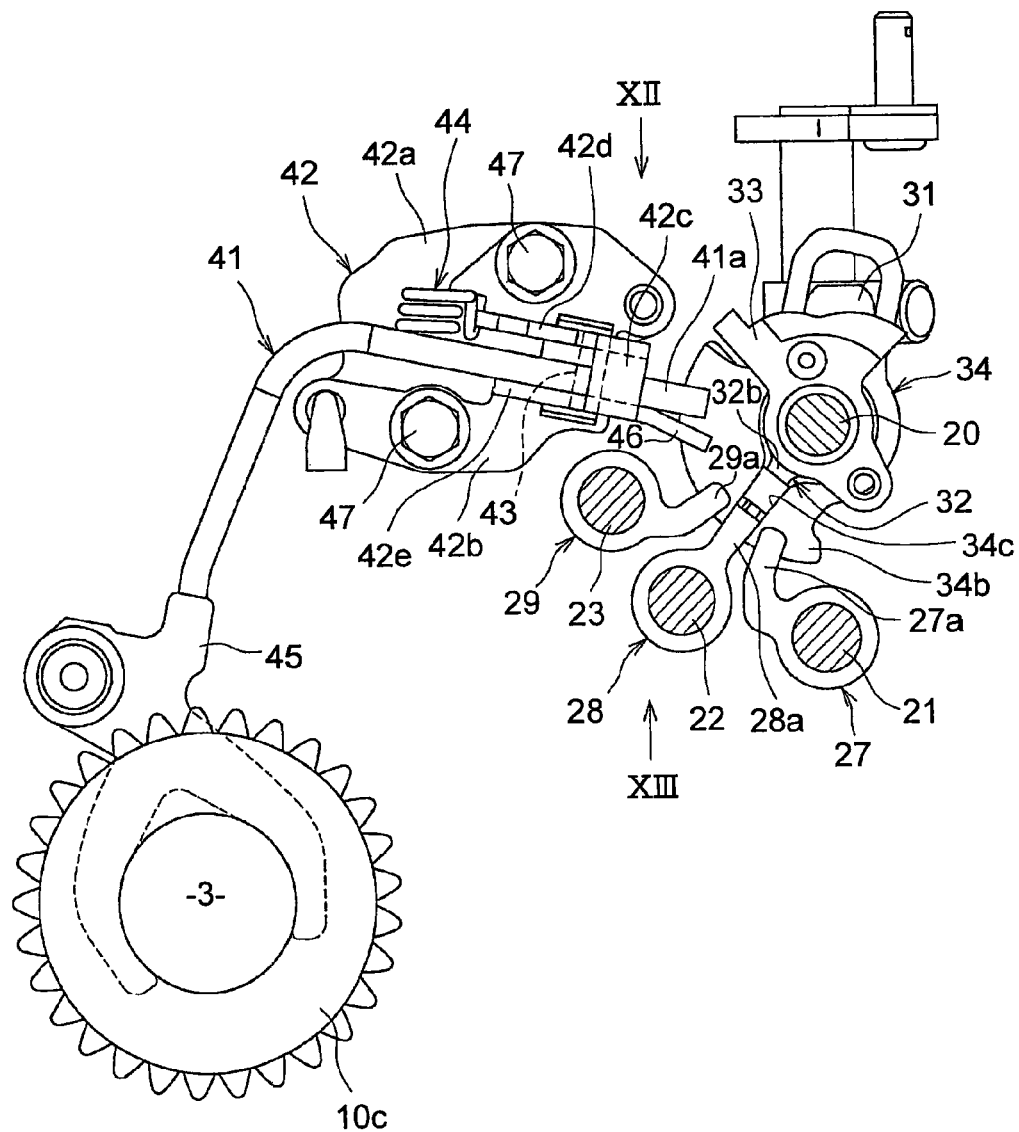
FIG. 5 is a view seen from a direction of an arrow V in FIG. 4.

As illustrated in FIG. 5 in a simplified manner, the first to third shift heads 27 to 29 are formed in a cylindrical shape, and integrally attached to the first to third fork shafts 21 to 23 by pins 35. In a predetermined circumferential region of each of the first to third shift heads 27 to 29, a pair of engagement pieces 27a, 28a, 29a is provided so as to project outwardly in a radial direction. An engageable recessed portion to which an arm portion 32b of the shift inner lever 32 is engaged selectively is formed between facing surfaces of each pair of engagement pieces 27a to 29a.

The selection inner lever 31 selects requested one of the first to third fork shafts 21 to 23. When the selection inner lever 31 receives a selection operation force for the shift lever 17 via a selection cable (not shown), the selection inner lever 31 gives a rotating force around the axis to the shift selection shaft 20.

The shift inner lever 32 slides selected one of the first to third fork shafts 21 to 23 in its axial direction. When the shift inner lever 32 receives a shift operation force for the shift lever 17 via a shift cable (not shown), the shift inner lever 32 gives a slide force along the axis direction to the shift selection shaft 20.

The shift inner lever 32 has a shape in which the arm portion 32b projects outwardly in the radial direction in a predetermined circumferential region of a tubular portion 32a fixed to an outer circumference of the shift selection shaft 20. Note that the tubular portion 32a is integrally attached to the shift selection shaft 20 by a pin 36.

The reverse lever 33 is provided in the shift selection shaft 20 in an integrally rotatable around the axis of the shift selection shaft 20 and in an integrally displaceable manner in the axis direction thereof.

The shift inner lever 32 is fitted to the interlock plate 34 in a relatively displaceable manner along the axis direction and in an integrally rotatable manner around the axis. The interlock plate 34 is provided with a projection 34b placed on an outer side of a boss portion 34a so as to project outwardly in the radial direction.

The tubular portion 32a of the shift inner lever 32 is loose-fitted to the boss portion 34a. The projection 34b is selectively engaged with any one of the pairs of the engagement pieces 27a to 29a of the first to third shift heads 27 to 29. The projection 34b is provided with a slit 34c. When the shift inner lever 32 is slid, the slit 34c allows the arm portion 32b of the shift inner lever 32 to pass therethrough.

Figure 11:
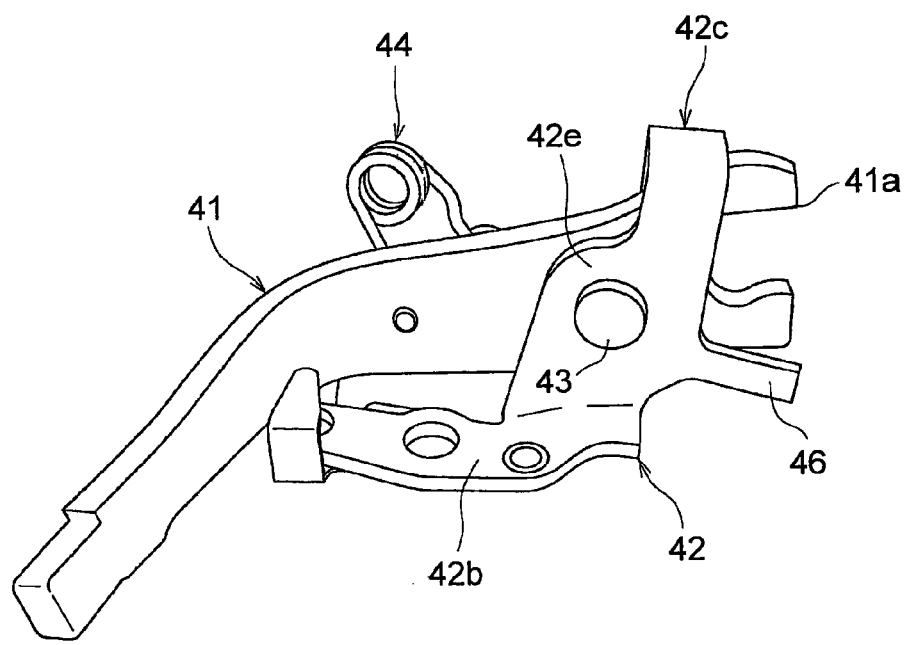
FIG. 11 is a perspective view of a reverse shift arm assembly in FIG. 5, and illustrates a state where the reverse shift arm assembly is viewed diagonally upward from below.
Figure 12:
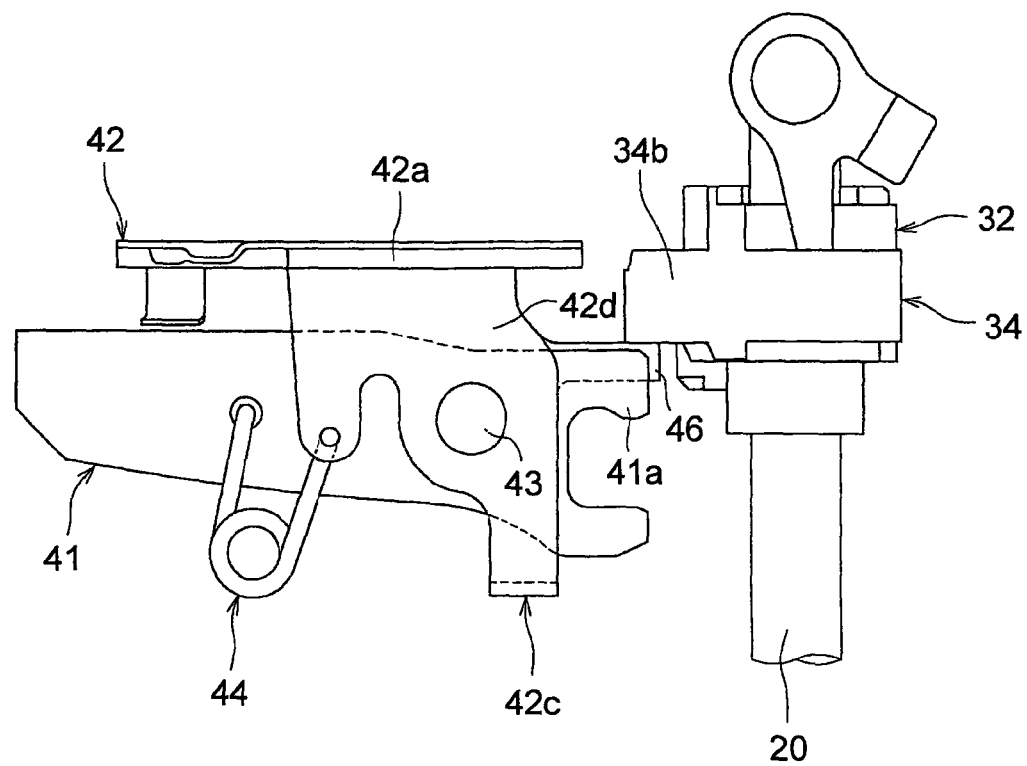
FIG. 12 is a view seen from a direction of an arrow XII in FIG. 5.
Figure 13:
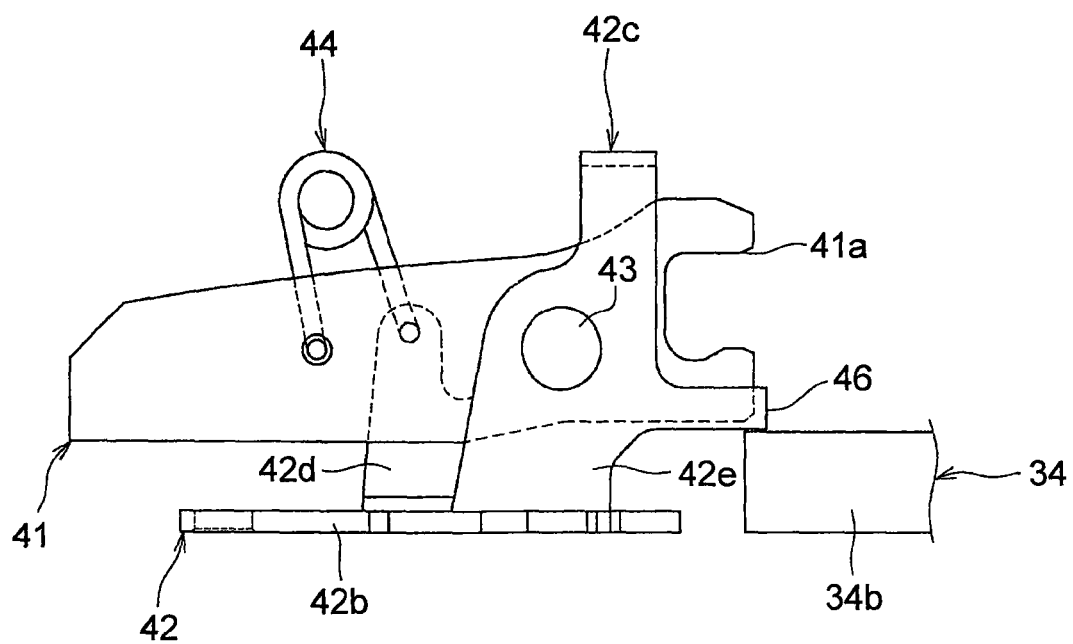
FIG. 13 is a view seen from a direction of an arrow XIII in FIG. 5.

The reverse shift arm 41 is adjacently provided on a rotating locus of the reverse lever 33 that rotates integrally with the shift selection shaft 20. As illustrated in FIGS. 11 to 13, the reverse shift arm 41 is supported by a bracket 42 via a spindle 43 in a pivoting manner.

The bracket 42 is fixed to a transmission case C by bolts 47 or the like. A torsion coil spring 44 is provided over the bracket 42 and the reverse shift arm 41. The torsion coil spring 44 generates an elastic force to bias the reverse shift arm 41 to a retreat position. The retreat position is a position at which the following reverse shift fork 45 does not press and move the idler reverse gear 10c.

A reverse head 41a is provided on one end side (an end closer to the reverse lever 33) of the reverse shift arm 41, and the reverse shift fork 45 is attached to the other end side of the reverse shift arm 41. When the reverse shift arm 41 is pivoted, the reverse shift fork 45 presses and moves the idler reverse gear 10c. The reverse shift arm 41. the bracket 42, and the torsion coil spring 44 are assembled to each other.

Next will be briefly described an operation of the selection shift mechanism configured as above.

Figure 10:
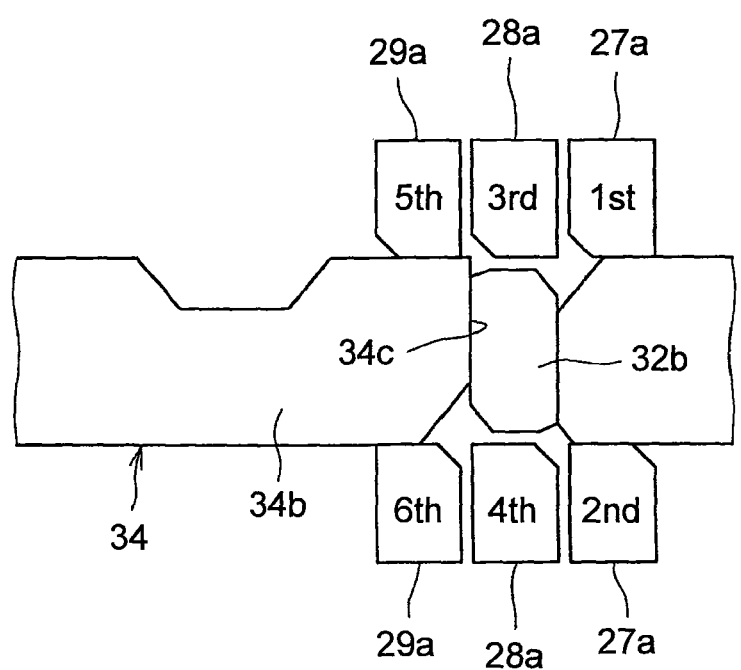
FIG. 10 is a view seen from a direction of an arrow X in FIG. 7.

In a state where the shift lever 17 is in a neutral position (P1 to P4) in the shift-operation direction (a state where any gear position is not established), the arm portion 32b of the shift inner lever 32 is fitted in the slit 34c of the interlock plate 34, and the engagement pieces 27a to 29a of the first to third shift heads 27 to 29 are aligned side by side, as illustrated in FIG. 10.

Here, when the shift lever 17 is selection-operated in the direction of the arrow X in FIG. 2, an operation force is transmitted to the shift selection shaft 20 via the selection cable (not shown) and the selection inner lever 31, so that the shift selection shaft 20 is rotated in one direction at a predetermined angle. FIG. 5 illustrates a stop position of the shift selection shaft 20 and the shift inner lever 32 at the time when the shift lever 17 is manipulated to the third-speed and fourth-speed selection position P2. Further, when the shift lever 17 is shift-operated in the direction of the arrow Y in FIG. 2, an operation force is transmitted to the shift cable (not shown) and the shift selection shaft 20, so that the shift selection shaft 20 is slid toward one side in the axis direction.

Further, when the shift lever 17 is selection-operated to the first-speed and second-speed selection position P1, the arm portion 32b of the shift inner lever 32 is engaged with the engagement pieces 27a of the first shift head 27 integrally attached to the first fork shaft 21 for first-second speed shift.

Further, when the shift lever 17 is selection-operated to the third-speed and fourth-speed selection position P2, the arm portion 32b of the shift inner lever 32 is engaged with the engagement pieces 28a of the second shift head 28 integrally attached to the second fork shaft 22 for third-fourth speed shift.

Furthermore, when the shift lever 17 is selection-operated to the fifth-speed and sixth-speed selection position P3, the arm portion 32b of the shift inner lever 32 is engaged with the engagement pieces 29a of the third shift head 29 integrally attached to the third fork shaft 23 for fifth-sixth speed shift.

Figure 6:
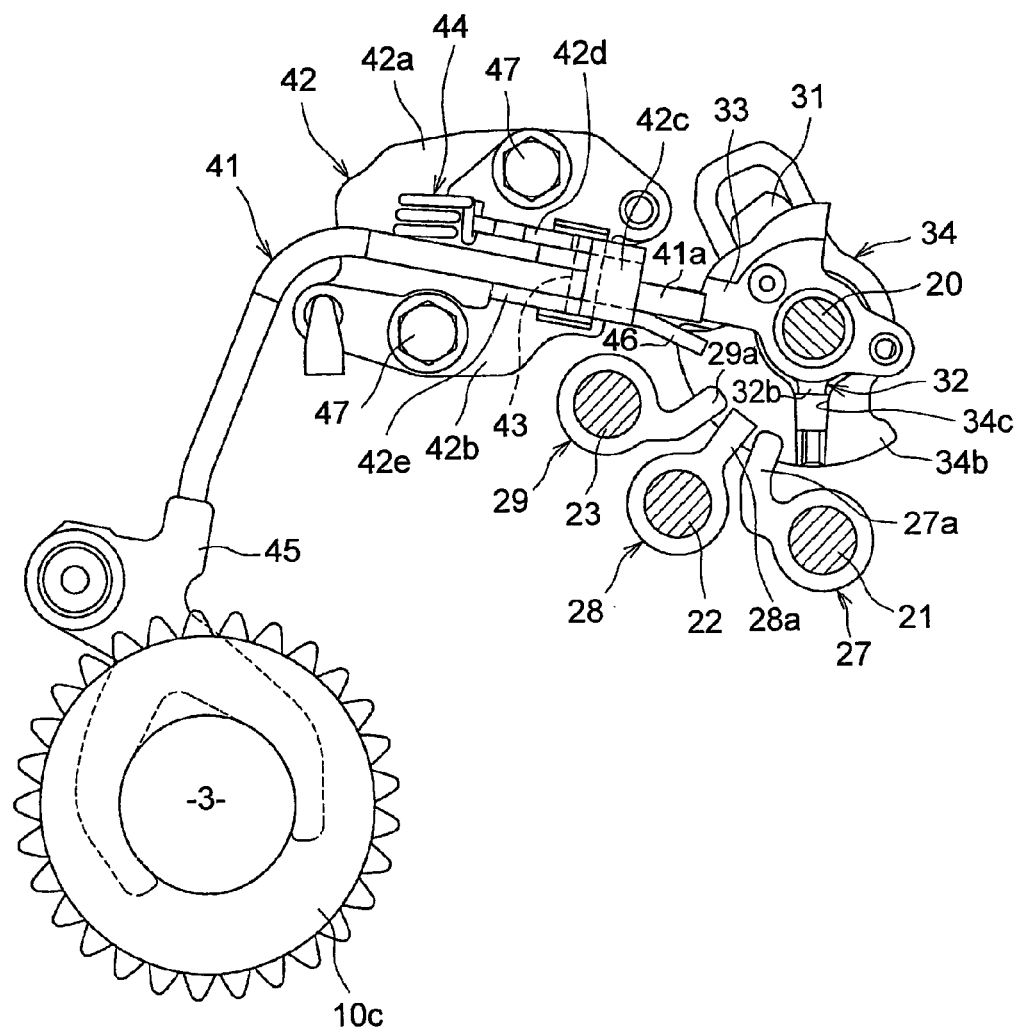
FIG. 6 is a view corresponding to FIG. 5 and illustrates a state of shifting to a reverse selection state.
Figure 7:
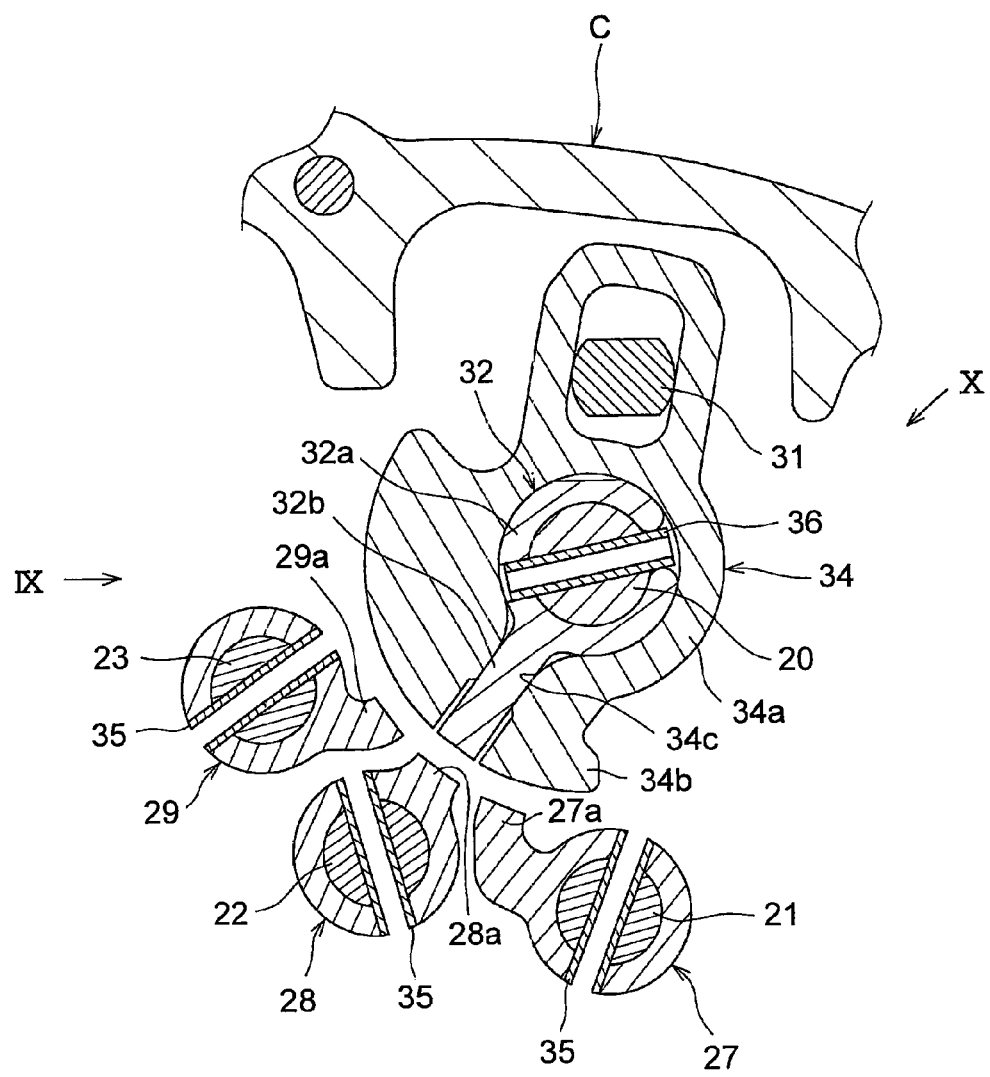
FIG. 7 is an arrow view taken along a line VII-VII in FIG. 4, and illustrates a neutral selection state.
Figure 8:
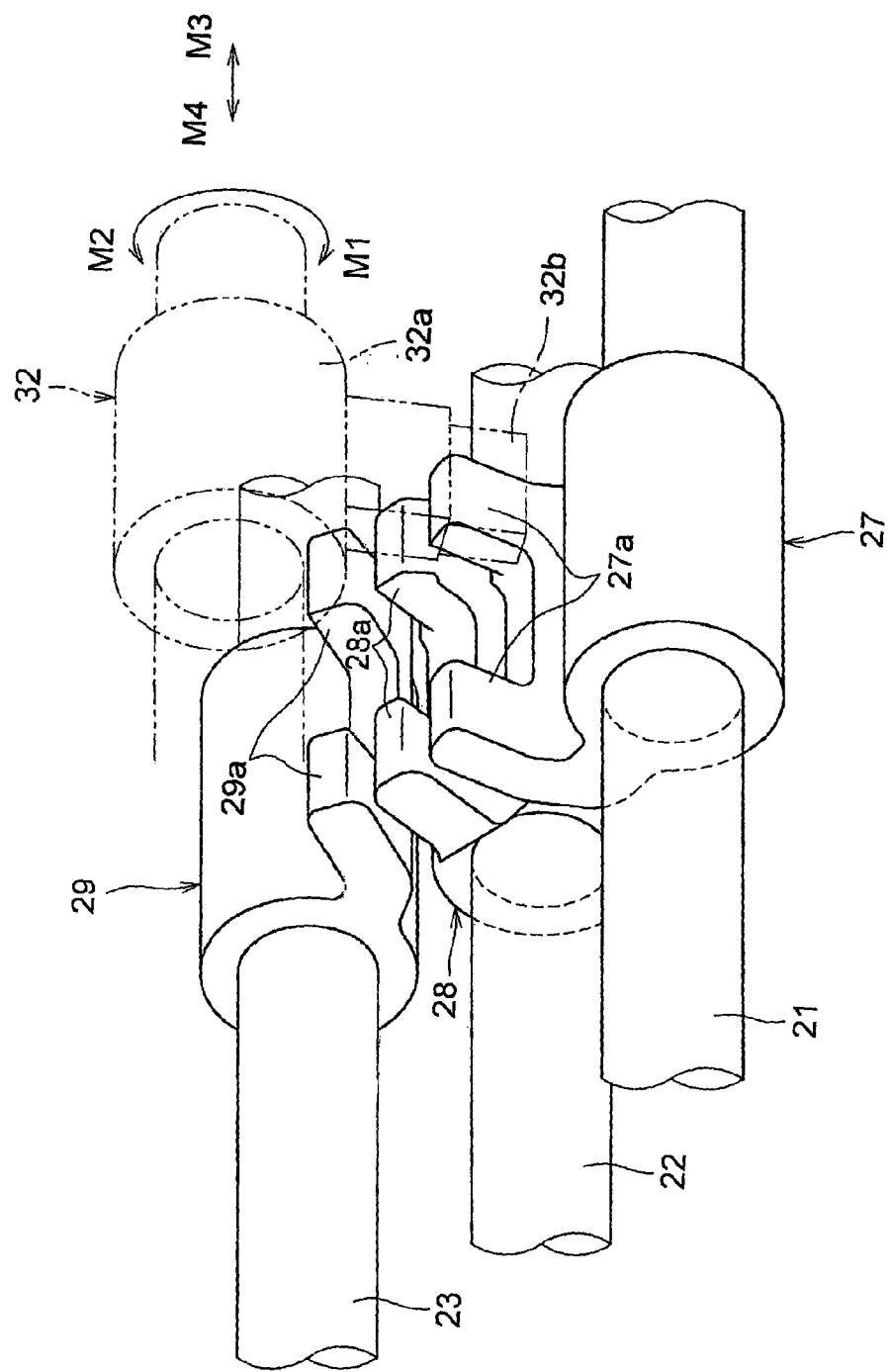
FIG. 8 is a perspective view to describe a relative position relationship between a shift inner lever and first to third shift heads in FIG. 5, and a movement of the shift inner lever.

Moreover, when the shift lever 17 is selection-operated to the reverse selection position P4, the shift selection shaft 20 rotates in a counterclockwise direction in FIG. 6, so that the reverse lever 33 is engaged with the reverse head 41a of the reverse shift arm 41.

Here, when the shift lever 17 is shift-operated from the selection positions P1 to P3 in FIG. 2, the shift selection shaft 20 slides along its axis direction, so that the arm portion 32b of the shift inner lever 32 slides any of the first to third shift heads 27 to 29 and its corresponding one of the first to third fork shafts 21 to 23 toward either side in the axis direction. Hereby, any of the sleeves 11a to 13a of the first to third synchromesh mechanisms 11 to 13 is slid to the same direction as the slide direction, so that any of the first to sixth gear positions is established.

Further, when the shift lever 17 is shift-operated to the reverse position REV from the reverse selection position P4 in FIG. 2, the reverse lever 33 and the shift selection shaft 20 are slid to the axis direction, so that the reverse shift arm 41 is pivoted by the reverse lever 33 in a predetermined direction against an elastic force of the torsion coil spring 44. Along with this, the reverse shift fork 45 integrated with the reverse shift arm 41 slides the idler reverse gear 10c in an axis direction of the reverse shaft 3. Hereby, the idler reverse gear 10c is meshed with the reverse drive gear 10a and the reverse driven gear 10b, so that the reverse gear position is established.

Figure 3:
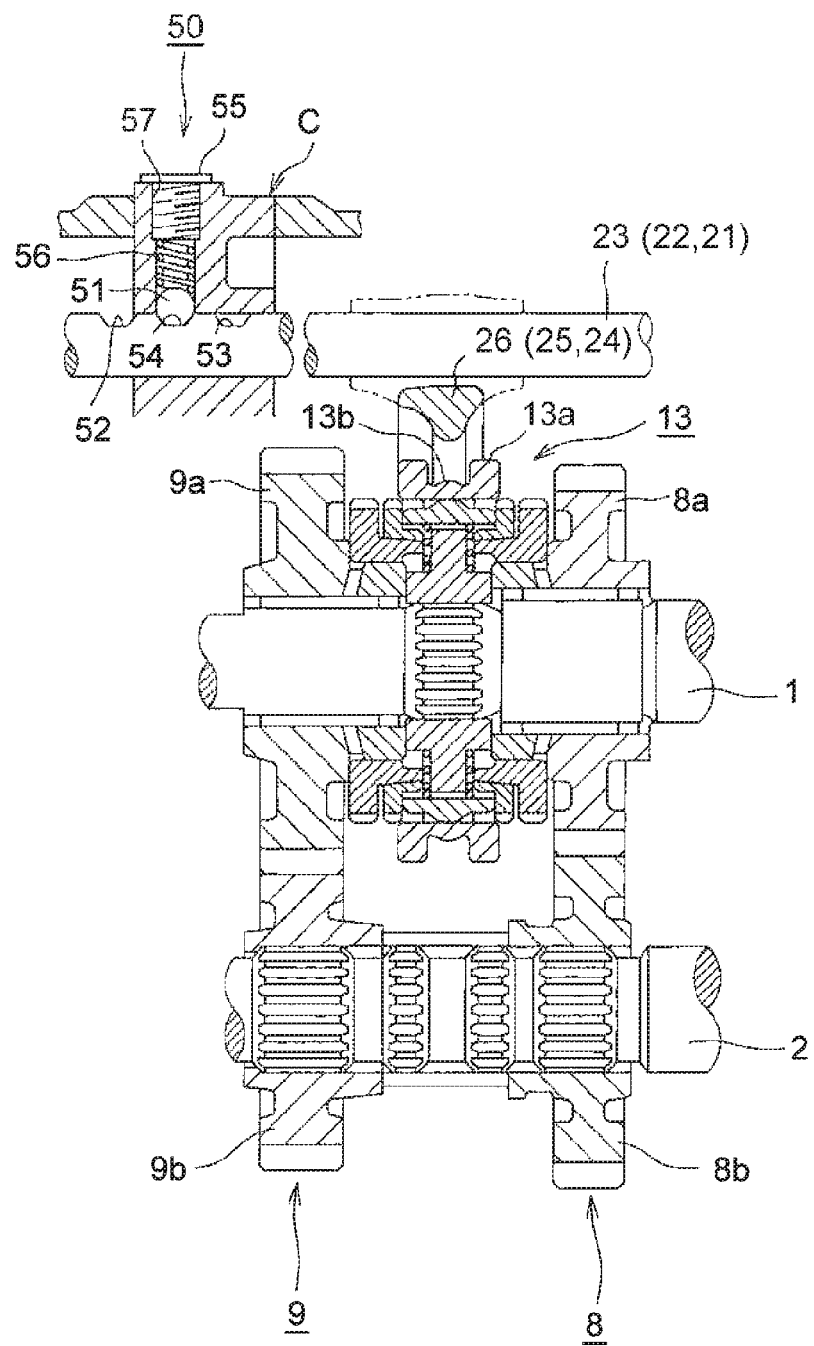
FIG. 3 is a sectional view illustrating a third fork shaft for fifth-sixth speed shift and a third synchromesh mechanism in the manual transmission of FIG. 1.

In the meantime, in the present embodiment, a detent mechanism 50 as illustrated in FIG. 3, for example, is provided in each of the first to third fork shafts 21 to 23. Three detent mechanisms 50 thus provided have the same configuration, so that only the detent mechanism 50 provided in the third fork shaft 23 for fifth-sixth speed shift is illustrated in FIG. 3 as a typical example.

The detent mechanisms 50 are provided so as to regulate slide operations of the first to third fork shafts 21 to 23 in the axis direction at three stages, thereby allowing the slide operations to be moderated, and further to hold the first to third fork shafts 21 to 23 in positions at the three stages, thereby preventing the gear from falling out. The detent mechanism 50 includes one locking ball 51, three engagement grooves 52, 53, 54, a coil spring 56, and the like.

The locking ball 51 is housed in a through hole 57 provided in the transmission case C. A plug 55 is threadedly engaged to an upper opening of the through hole 57, and a coil spring 56 is housed between the plug 55 and the locking ball 51 in a compressional state. Due to a restoring force of the coil spring 56, the locking ball 51 is pressed outwardly from a lower opening of the through hole 57.

The three engagement grooves 52 to 54 are provided in line at a predetermined interval in the axis direction of the first to third fork shafts 21 to 23. The locking ball 51 is engaged with any of the engagement grooves 52 to 54. In the example of FIG. 3, the locking ball 51 is engaged with the engagement groove 52 on the left side in the figure at the time when the fifth gear position is selected, the locking ball 51 is engaged with the engagement groove 53 on the right side in the figure at the time when the sixth gear position is selected, and the locking ball 51 is engaged with the engagement groove 54 in the middle in the view at the time of a neutral state where neither the fifth gear position nor the sixth gear position is selected.

When selected one of the first to third fork shafts 21 to 23 is slid in the axis direction, any of the three engagement grooves 52 to 54 stops at a position where the locking ball 51 exists, according to a sliding amount, so that the locking ball 51 is engaged therewith. When the locking ball 51 is engaged with any of the engagement grooves 52 to 54 once and then climbs it over to jump out therefrom, an elastic force of the coil spring 56 allows the slide operation of the first to third fork shafts 21 to 23 to be moderated appropriately.

Further, when the slide operation of selected one of the first to third fork shafts 21 to 23 is stopped in a state where the locking ball 51 is engaged with selected one of the three engagement grooves 52 to 54, the slide operation of the selected one of the first to third fork shafts 21 to 23 in the axis direction is inhibited. Hereby, a selected gear position is retained and the gear is prevented from falling off.

In the meantime, a detent force of the detent mechanism 50 is a force that prevents the locking ball 51 from climbing over edges of the engagement grooves 52 to 54. If the detent force is weak, the locking ball 51 easily comes off from the engagement grooves 52 to 54, so that the first to third fork shafts 21 to 23 are easy to move. As a result, the gear falls off due to an impact, so that a selected gear position cannot be maintained. In order to prevent such gear slip-out, the detent force is set to be high to some extent. However, while the detent force is necessary to prevent gear slip-out after the gear is engaged, the detent force counteracts a driving force of the first to third fork shafts 21 to 23 at the time of gear change (at the time when the gear is disengaged or the gear is engaged). In view of this, a force that allows the locking ball 51 to climb over the edges of the engagement grooves 52 to 54 against a spring force of the coil spring 56 should be added to the first to third fork shafts 21 to 23. It is necessary for the shift operation force to exceed the climbing force. Accordingly, if the detent force (=the climbing force) is strong, the first to third fork shafts 21 to 23 must be slid with a strong shift operation force. However, if the detent force is strong, the operation start of the first to third fork shafts 21 to 23 at the time of starting of gear change is not smooth, so that the gear change takes time.

Next will be described a configuration to inhibit inclination of the interlock plate 34 at the time of a shift operation, with reference to FIGS. 4 to 13.

Figure 9:
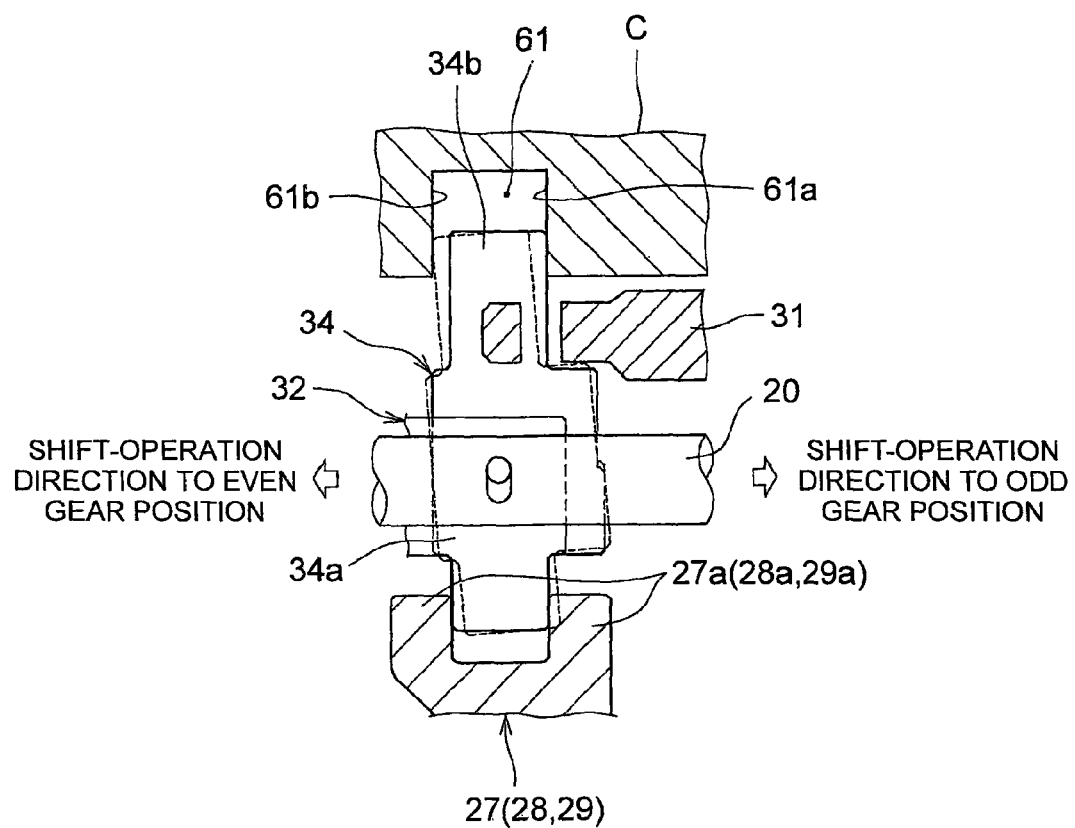
FIG. 9 is a view seen from a direction of an arrow IX in FIG. 7.

As illustrated in FIGS. 4 and 9, an upper part of the projection 34b of the interlock plate 34 is fitted into a recessed portion 61 of the transmission case C with an appropriate clearance (a gap in the axis direction and in the radial direction) that allows relative displacement. Further, the boss portion 34a of the interlock plate 34 is outwardly engaged with the tubular portion 32a of the shift inner lever 32 with an appropriate clearance (a gap in the radial direction) that allows relative displacement. In this case, the interlock plate 34 could be inclined in the axis direction by the clearances.

Figure 14:
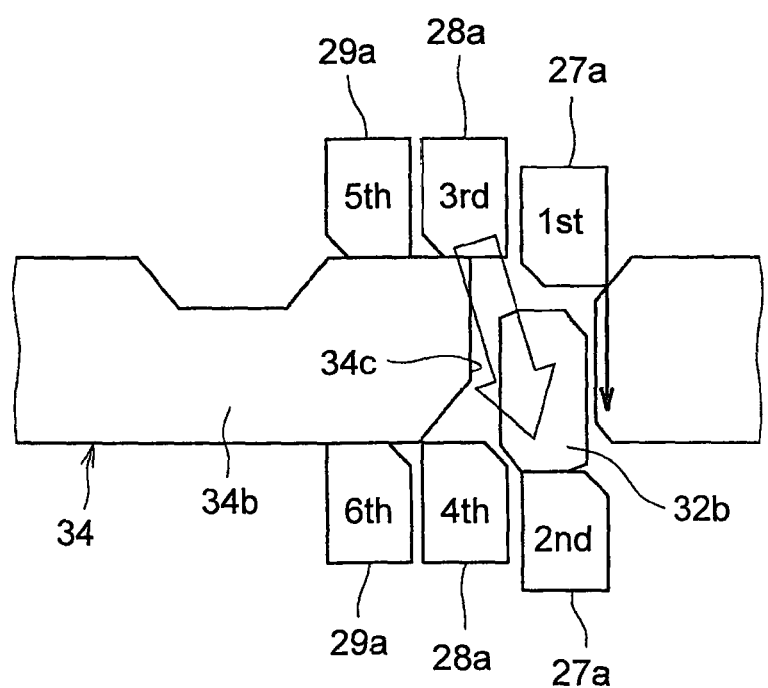
FIG. 14 is a view corresponding to FIG. 10, and a view to describe a reason why an inclination force is applied to the interlock plate.

Incidentally, as illustrated in FIG. 14, for example, when the gears are changed from the third gear to the second gear, the engagement piece 28a on the third gear side of the second shift head 28 presses the interlock plate 34, and the engagement piece 27a on the first gear side of the first shift head 27 presses the interlock plate 34 as indicated by the arrow, in the course where the arm portion 32b of the shift inner lever 32 is moved as indicated by a blank arrow in the view. Accordingly, a motion component in the shift direction and a motion component in the selection direction are added to the arm portion 32b. Therefore, a force (an inclination force) to incline the interlock plate 34 is applied to the interlock plate 34.

In the present embodiment, one inner wall (an inner wall 61a on the right side in FIGS. 4 and 9) of those two inner walls of the recessed portion 61 which are opposed to the projection 34b of the interlock plate 34 receives, from the axis direction; several parts (not shown in the figure) of the circumference of one side face of the projection 34b of the interlock plate 34 at the time of a shift operation to an odd gear position (the first gear position, the third gear position, the fifth gear position). This makes it hard for the interlock plate 34 to be inclined.

In the meantime, the other inner wall (an inner wall 61b on the left side in FIGS. 4 and 9) of the recessed portion 61 receives only a partial region of an upper half of the circumference of the projection 34b of the interlock plate 34, at the time of a shift operation to an even gear position (the second gear position, the fourth gear position, the sixth gear position). Accordingly, the interlock plate 34 could be easily inclined.

That is, since the transmission case C has, on the circumference, several parts (the one inner wall 61a of the recessed portion 61) that regulate the inclination of the interlock plate 34 at the time of the shift operation to an odd gear position, the interlock plate 34 is hard to be inclined. However, since the transmission case C has, on the circumference, only one part (the other inner wall 61b of the recessed portion 61) that regulates the inclination of the interlock plate 34 at the time of the shift operation to an even gear position, the interlock plate 34 is easy to be inclined.

In view of this, the present embodiment employs the following configuration in order to reduce the inclination of the interlock plate 34 at the time of the shift operation to an even number gear position, as much as possible.

More specifically, the bracket 42 to fix the reverse shift arm 41 to the transmission case C is provided with a projection 46 for axially receiving a predetermined position of a bottom half of the circumference of the interlock plate 34 at the time of the shift operation to an even gear position. The projection 46 is placed in a position distanced, on the circumference, from the other inner wall 61b of the recessed portion 61. The projection 46 corresponds to the "regulation portion" in Claims.

The bracket 42 is configured such that an upper attachment piece 42a and a lower attachment piece 42b are connected via a connection portion 42c curved in a U-shape.

A bolt insertion hole (a reference sign is omitted) is formed in each of the attachment pieces 42a, 42b. A bolt 47 for fixing the bracket 42 to the transmission case C is passed through the bolt insertion hole.

The reverse shift arm 41 is inserted between facing surfaces of an upper side wall 42d and a lower side wall 42e of the connection portion 42c, and a spindle 43 is provided so as to penetrate through an overlap portion therebetween. One end of the spindle 43 is fixed to the upper side wall 42d, and the other end of the spindle 43 is fixed to the lower side wall 42e.

The projection 46 is provided on the lower side wall 42e, and is formed in a rectangular shape in a plane view. An internal corner shape of a link portion of a root side of the projection 46 with the lower side wall 42e is curved in a partial arc shape. A reason of this is as follows: when the projection 34b of the interlock plate 34 abuts with the projection 46 and an inclination force of the interlock plate 34 is applied thereto, a stress is dispersed so as not to concentrate on the root side of the projection 46, thereby making it hard to break the projection 46.

In a case where such a configuration is employed, when the inclination force is applied to the interlock plate 34 along with the shift operation to an even gear position, those two parts of the projection 34b of the interlock plate 34 which are separated from each other on the circumference are received by the projection 46 of the bracket 42 and the other inner wall 61b of the recessed portion 61 in the axis direction. Accordingly, the inclination of the interlock plate 34 is restrained. Besides, as described above, the bracket 42 is fixed to the transmission case C, so that the projection 46 provided in the bracket 42 can receive the interlock plate 34 firmly without backlash. As a result, it is possible to effectively restrain the inclination of the interlock plate 34.

As described above, according to the embodiment to which the present invention is applied, while the inclination of the interlock plate 34 is restrained by the transmission case C at the time of the shift operation to an odd gear position (the first gear position, the third gear position, the fifth gear position), the inclination of the interlock plate 34 is restrained by the projection 46 of the bracket 42 of the reverse shift arm 41 at the time of the shift operation to an even gear position (the second gear position, the fourth gear position, the sixth gear position).

This makes it possible to prevent such a problem that a sliding friction of the shift inner lever 32 is increased due to the inclination of the interlock plate 34 at the time of a shift operation, thereby making it possible to achieve a smooth change gear operation.

The present invention is not limited to the above embodiment, and can be modified appropriately within the scope of Claims and within a scope equivalent thereto.

For example, in the above embodiment, the shift selection shaft 20 may be operated upon receipt of an operation force by a manual operation, or may be operated upon receipt of a driving force by an actuator.

Further, the above embodiment deals with an example in which the present invention is applied to a configuration in which the inclination of the interlock plate 34 at the time of the shift operation to an even gear position cannot be restrained only by the recessed portion 61 of the transmission case C. However, the present invention can be also applied to a configuration in which the inclination of the interlock plate 34 at the time of the shift operation to an odd gear position cannot be restrained only by the recessed portion 61 of the transmission case C.

The present invention is preferably applicable to a manual transmission for establishing one of multiple forward gear positions and a reverse gear position by combining a selection operation and a shift operation in response to a gear change request.

What is claimed is:

1. A manual transmission for establishing one of multiple forward gear positions and a reverse gear position by combining a selection operation and a shift operation in response to a gear change request, the manual transmission comprising:
   a transmission case;
   a shift selection shaft supported by the transmission case, the shift selection shaft being configured such that i) the selection operation to rotate the shift selection shaft around the axis of the shift selection shaft is performed and ii) the shift operation to displace the shift selection shaft in an axis direction that the axis extends is performed;
   a shift inner lever including a tubular portion and an arm portion, the tubular portion being integrally fitted to a radial outside of the shift selection shaft, the arm portion being provided on a radial outside of the tubular portion, and the arm portion being extended outwardly in a radial direction of the tubular portion;
   an interlock plate including a boss portion and a projection, the boss portion being fitted to the radial outside of the tubular portion such that i) the boss portion is displaced in the axis direction relative to the tubular portion of the shift inner lever and ii) the boss portion rotates integrally with the tubular portion around the axis, the projection being provided on a radial outside of the boss portion such that the projection extends outwardly in the radial direction, and the projection having a slit such that the arm portion is inserted into the slit and the arm portion is displaced in the axis direction relative to the projection;
   a reverse lever provided integrally with the shift selection shaft; and a reverse shift arm supported by the transmission case via a bracket such that the reverse shift arm pivots relative to the transmission case, the reverse shift arm being configured to be pivoted by rotations of the reverse lever and the shift selection shaft along with the shift operation to the reverse gear position, and the bracket being provided with a regulation portion that regulates inclination of the interlock plate at a time when the shift operation is performed, wherein:

the transmission case includes a recessed portion;

a part of the interlock plate is fitted to the recessed portion via a clearance that allows a relative displacement between the interlock plate and the transmission case;

the recessed portion is configured to regulate the displacement of the interlock plate in the axis direction; and an inner wall of the recessed portion and the regulation portion are configured to receive and contact a wall surface of the projection of the interlock plate to regulate the inclination of the interlock plate at a time when the shift operation to the forward gear positions is performed.

2. The manual transmission according to claim 1, wherein:

the reverse shift arm includes a reverse head and a reverse shift fork;

the reverse lever is configured such that the reverse lever engages with the reverse head along with the selection operation to the reverse gear position;

the reverse shift fork is configured to cause an idler reverse gear to mesh with a reverse drive gear and a reverse driven gear along with the pivoting of the reverse shift arm; and the regulation portion is a projection member provided in the bracket and the projection member projects from the vicinity of the reverse head toward the interlock plate.

* * * * *